US006554486B1

(12) United States Patent
Takamatsu et al.

(10) Patent No.: US 6,554,486 B1
(45) Date of Patent: Apr. 29, 2003

(54) OPTICAL CONNECTOR

(75) Inventors: Michihiro Takamatsu, Kawasaki (JP); Mitsuo Kaetsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/334,615

(22) Filed: Jun. 17, 1999

(30) Foreign Application Priority Data

Sep. 14, 1998 (JP) .............................. 10-260600

(51) Int. Cl.[7] .............................. G02B 6/38; G02B 6/36
(52) U.S. Cl. .............................. 385/75; 385/53; 385/59; 385/77; 385/60
(58) Field of Search .............................. 385/75, 53, 55, 385/72, 78, 77, 59, 60

(56) References Cited

U.S. PATENT DOCUMENTS 4,445,750 A  *  5/1984  Grois et al. .................... 385/75
4,568,145 A  *  2/1986  Colin et al. .................... 385/75
5,473,715 A  * 12/1995  Schofield et al. .............. 385/75
5,528,711 A  *  6/1996  Iwano et al. .................... 385/75
5,729,644 A  *  3/1998  Shiflett et al. ................ 385/59

FOREIGN PATENT DOCUMENTS

JP        241670 A  *  9/2000  ............ G02B/6/38

OTHER PUBLICATIONS

IEC 61754–6, pp. 51–67.

* cited by examiner

Primary Examiner—Audrey Chang
(74) Attorney, Agent, or Firm—Staas & Halsey LLP

(57) ABSTRACT

An optical connector has an optical-connector housing in which a ferrule at an extending end of an optical fiber is incorporated, the optical-connector housing having a coding-key mounting portion. A coding key is mounted at the coding-key mounting portion in a condition in which the extending end of the coding key projects further than the extending end of the ferrule.

6 Claims, 17 Drawing Sheets

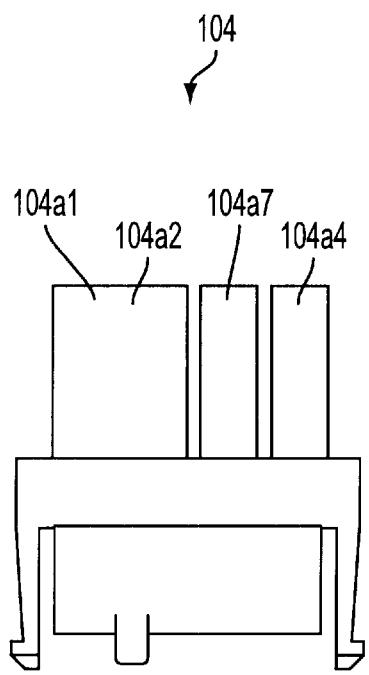
FIG. 4A
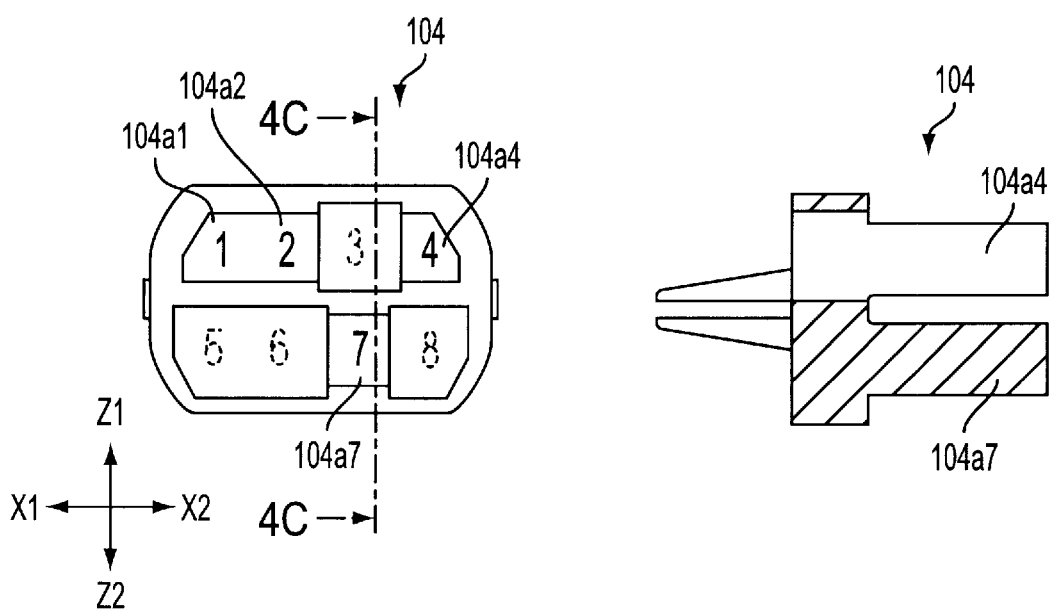
FIG. 4B
FIG. 4C

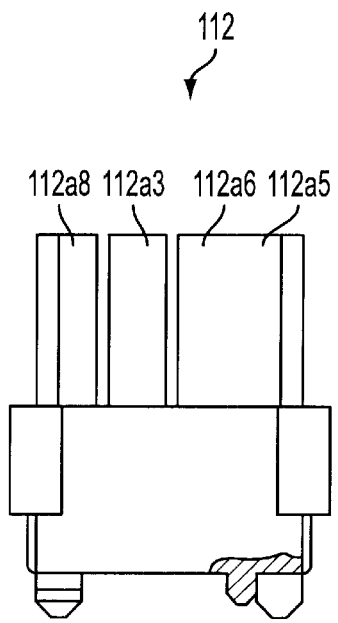
FIG. 6A
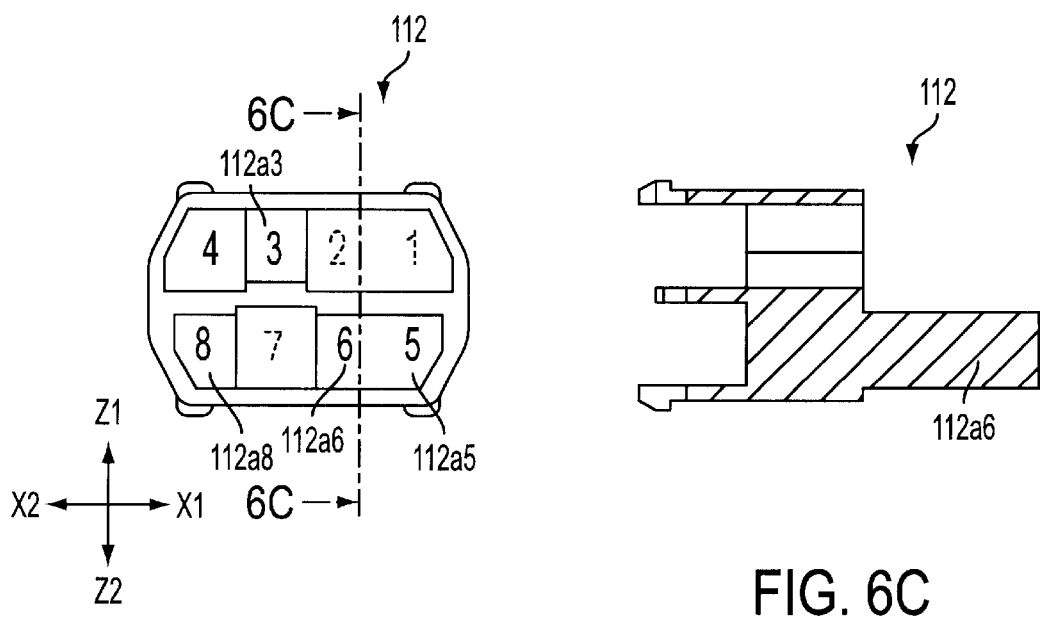
FIG. 6B
FIG. 6C

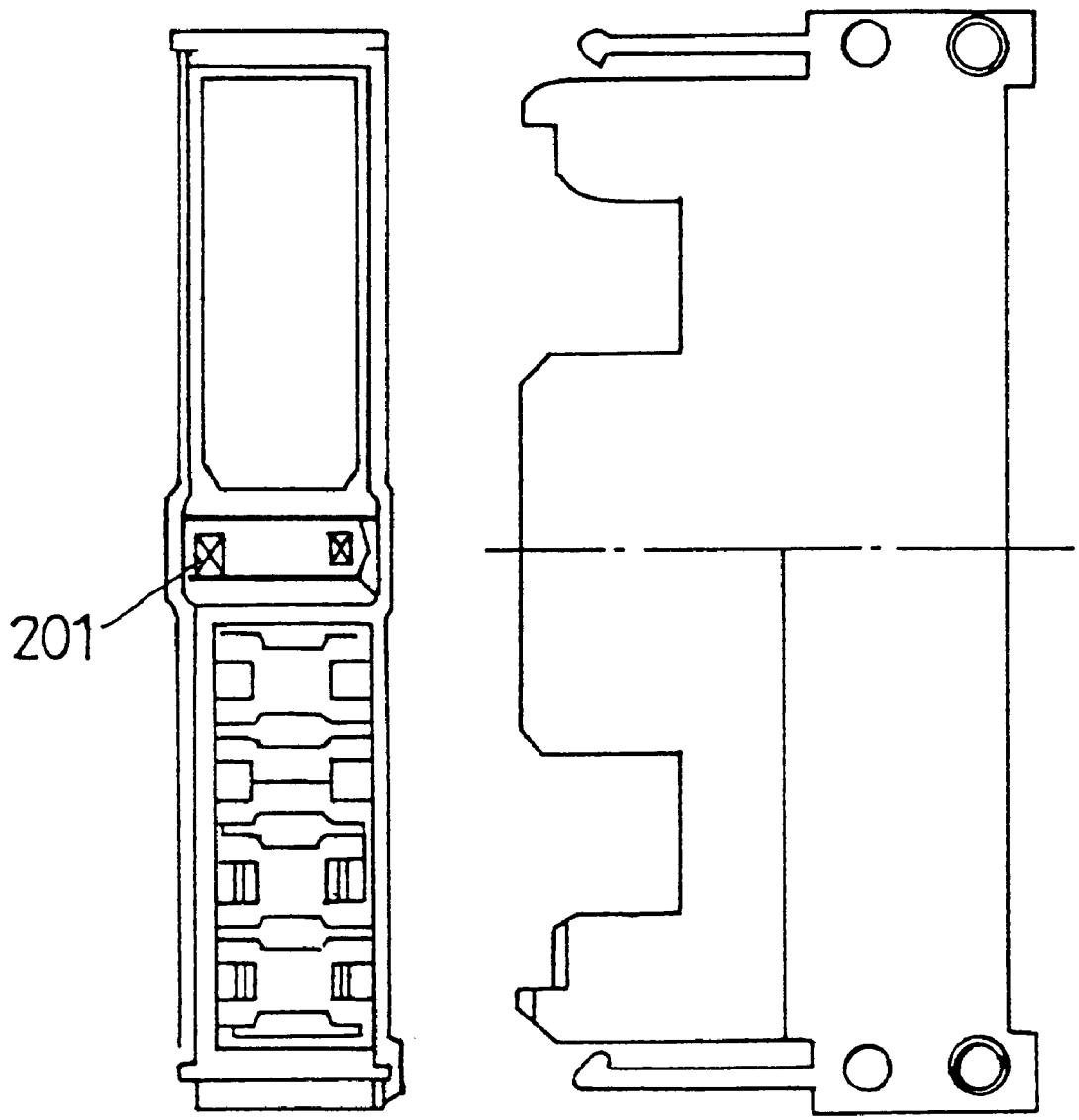

110A

110A

OPTICAL CONNECTOR

BACKGROUND OF THE INVENTION

1. Field of the Invention

The present invention relates to an optical connector, and to an optical connector which is used for connecting a plurality of packages and a backplane in a communication apparatus, in which apparatus, the plurality of packages are inserted into a shelf, and are connected to the backplane side by side.

In the communication apparatus in which the plurality of packages are inserted into the shelf, and are connected to the backplane side by side, optical modules are loaded on the packages in addition to electronic modules. Therefore, connections between the packages and the backplane include not only electric connections but also optical connections. Therefore, in groups of connectors along edges of inserting-direction ends of the packages, electric connectors and optical connectors are mixed. Therefore, at a time of assembling and maintenance of the communication apparatus, measures to cope with a case where another package is erroneously inserted into a package insertion portion to which a predetermined package should be inserted should be taken also for the optical connectors.

2. Description of the Related Art

With regard to the electric connectors, measures for preventing connection between electric connectors, which do not correspond to one another, by incorporating coding keys therein, are taken. However, the optical connectors do not have such coding keys.

Therefore, when another package has been erroneously inserted into a package inserting portion for a predetermined package, optical connectors of the package face electric connectors on the backplane, and the optical connectors are forcibly connected to the electric connectors. In this case, ferrules, which are incorporated into the optical connectors in a manner in which they are aligned, abut against terminals of the electric connectors, and, thereby, the ferrules are damaged. When the extending-end surfaces of the ferrules are damaged, optical-signal transmission efficiency in a case where optical connectors are connected with one another is degraded.

SUMMARY OF THE INVENTION

An object of the present invention is to provide an optical connector in which the above-mentioned problem is solved.

An optical connector according to the present invention comprises an optical-connector housing in which a ferrule at the extending end of an optical fiber is incorporated, the optical-connector housing having a coding-key mounting portion, wherein a coding key is mounted at the coding-key mounting portion in a condition in which the extending end of the coding key projects further than the extending end of the ferrule.

In this arrangement, the coding key is mounted to the optical connector, and, also, the extending end of the coding key projects further than the extending end of the ferrule. Thereby, when the optical connector is erroneously attempted to be connected with an electrical connector, the coding key of the optical key abuts against a coding key of the electrical connector so that further approach of these connectors is prevented. As a result, the extending-end surface of the ferrule is prevented from being damaged.

Further, when a worker presses one of these connectors against the other with great force, the coding keys are damaged, so that the optical connector and the electrical connector are prevented from being damaged.

Further, optical connectors which do not correspond to one another are prevented from being connected.

An optical connector according to another aspect of the present invention comprises an optical-connector housing in which a ferrule at the extending end of an optical fiber is incorporated, wherein:

the optical-connector housing has a first coding key special for optical connectors;

the first coding key special for optical connectors has an arrangement such that the first coding key special for optical connectors abuts against any of all the standardized coding keys, but the first coding key special for optical connectors does not abut against a second coding key special for optical connectors, which is a counterpart of the first coding key special for optical connectors; and the extending end of the first coding key special for optical connectors projects further than the extending end of the ferrule.

In this arrangement, the optical-connector housing has the coding key special for optical connectors, and the coding key special for optical connectors has an arrangement such that the coding key special for optical connectors abuts against any of all the standardized coding keys. Thereby, the coding key of the optical connector inevitably abuts against the coding key of any electrical connector when the optical connector is attempted to be connected with the electrical connector. As a result, further approach of these connectors is prevented, and the extending-end surface of the ferrule of the optical fiber is prevented from being damaged.

Further, in this arrangement, the first coding key special for optical connectors does not abut against the second coding key special for optical connectors, which is a counterpart of the first coding key special for optical connectors. Thereby, connection between these optical connectors is performed without hindrance.

An optical connector according to another aspect of the present invention comprises an optical-connector housing in which a ferrule at the extending end of an optical fiber is incorporated, the optical-connector housing having, at both ends in the longitudinal directions thereof, arm portions, wherein the arm portions are provided at such positions that the arm portions abut against portions of a housing of an electrical connector when the optical connector and the electrical connector are attempted to be connected with one another, so that connection therebetween is prevented.

Thus, merely by changing the shape of the housing, it is possible to prevent connection between the optical connector and the electrical connector as a result of the arm portions of the optical connector abutting against the portions of the housing of the electrical connector when the optical connector is attempted to be connected with the electrical connector.

An optical connector according to another aspect of the present invention comprises an optical-connector housing in which a ferrule at the extending end of an optical fiber is incorporated, said optical-connector housing having, on both sides in the width directions thereof, projecting portions, wherein said projecting portions are provided at such positions that said projecting portions abut against portions of a housing of an electrical connector when said optical connector and said electrical connector are attempted to be connected with one another, so that connection therebetween is prevented.

Thus, merely by changing the shape of the housing, it is possible to prevent connection between the optical connector and the electrical connector as a result of the projecting portions of the optical connector abutting against the portions of the housing of the electrical connector when the optical connector is attempted to be connected with the electrical connector.

Other objects and further features of the present invention will become more apparent from the following detailed description when read in conjunction with the accompanying drawings.

BRIEF DESCRIPTION OF DRAWINGS

FIGS. 4A, 4B and 4C show a coding key mounted to the housing shown in FIGS. 3A, 3B, 3C and 3D;

FIGS. 6A, 6B and 6C show a coding key mounted to the housing shown in FIGS. 5A, 5B, 5C and 5D;

FIGS. 11A and 11B show a housing of the package-side optical connector shown in FIG. 10;

DETAILED DESCRIPTION OF THE PREFERRED EMBODIMENTS

Figure 1:
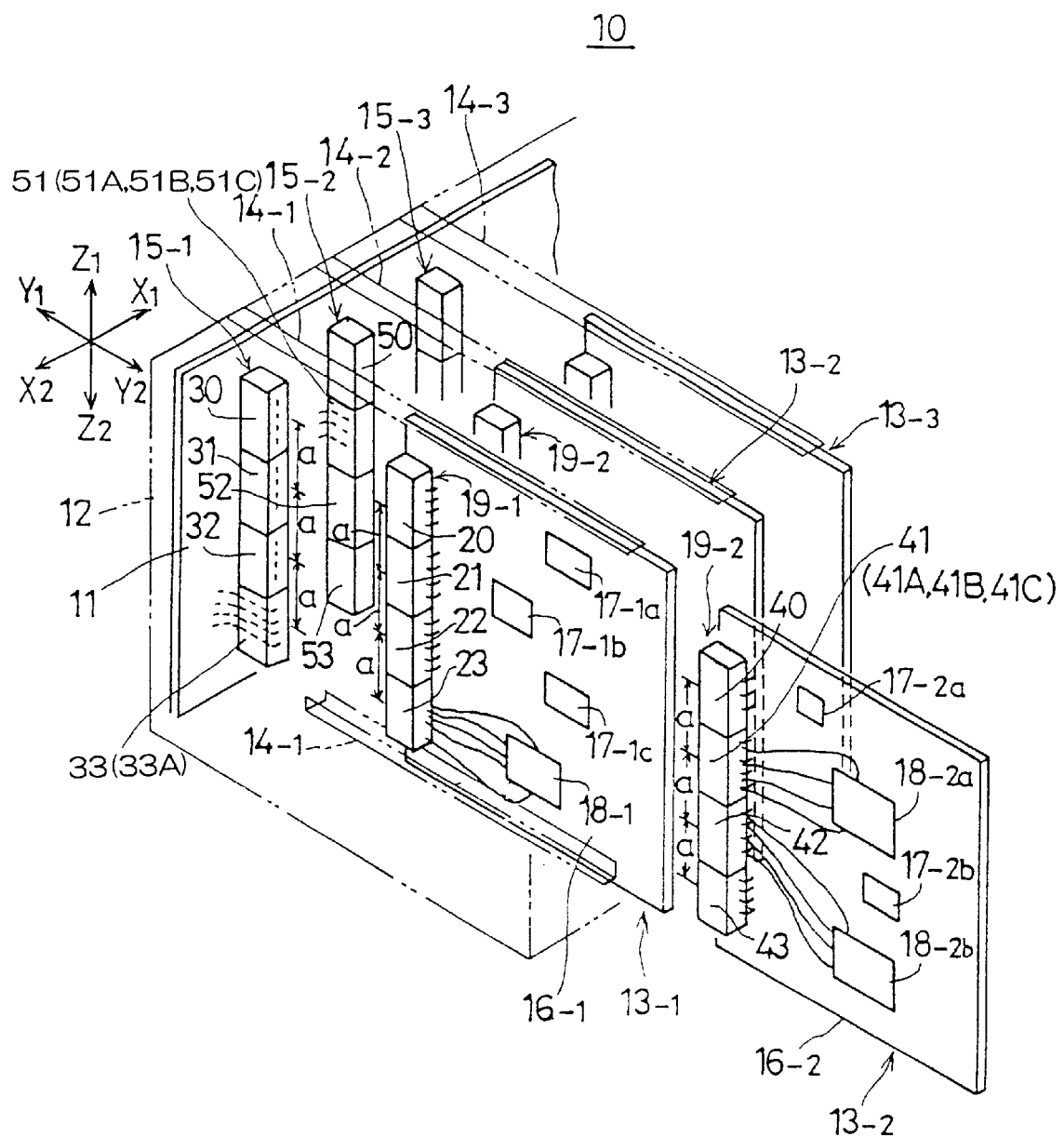
FIG. 1 shows a communication apparatus in which the present invention is used.

For the sake of explanation, a communication apparatus in which optical connectors according to the present invention are used will now be described. As shown in FIG. 1, in the communication apparatus 10, a plurality of packages 13-1, 13-2 and 13-3 are guided by guide rails 14-1, 14-2 and 14-3, respectively, and are inserted into a shelf 12 in the Y1 direction, a backplane 11 being provided on the back side of the shelf. Thus, the packages 13-1, 13-2 and 13-3 are loaded in the communication apparatus 10 as a result of being connected through connectors. The packages 13-1, 13-2 and 13-3 are arranged in the X1, X2 directions.

On the backplane 11, a group of connectors 15-1, 15-2 and 15-3 are provided corresponding to the guide rails 14-1, 14-2 and 14-3 of the shelf 12.

In the package 13-1, electronic modules 17-1a, 17-1b, 17-1c and an optical module 18-1 are mounted mixedly on a package body 16-1. Further, a group of connectors 19-1 are provided along the Y1-direction-end edge of the package body 16-1. In the group of connectors 19-1, an electric connector 20, an electric connector 21, an electric connector 22 and an optical connector 23 are arranged in the stated order in the Z2 direction.

In the group of connectors 15-1 on the backplane 11, an electric connector 30, an electric connector 31, an electric connector 32 and an optical connector 33 are arranged in the stated order in the Z2 direction, corresponding to the above-mentioned group of connectors 19-1.

In the package 13-2, electronic modules 17-2a, 17-2b and optical modules 18-2a, 18-2b are mounted mixedly on a package body 16-2. Further, a group of connectors 19-2 are provided along the Y1-direction-end edge of the package body 16-2. In the group of connectors 19-2, an electric connector 40, an optical connector 41, an optical connector 42 and an electric connector 43, are arranged in the stated order in the Z2 direction.

In the group of connectors 15-2 on the backplane 11, an electric connector 50, an optical connector 51, an optical connector 52 and an electric connector 53 are arranged in the stated order in the Z2 direction, corresponding to the above-mentioned group of connectors 19-2.

In each of the groups of connectors 19-1, 15-1, 19-2 and 15-2, the dimension 'a' between the centers of each pair of adjacent connectors is equal to each other.

When the package 13-1 is guided by the guide rails 14-1 and is inserted in the Y1 direction, the group of connectors 19-1 are connected to the group of connectors 15-1 normally. When the package 13-2 is guided by the guide rails 14-2 and is inserted in the Y1 direction, the group of connectors 19-2 are connected to the group of connectors 15-2 normally.

When a work is erroneously performed in which the package 13-2 is inserted into the guide rails 14-1, the group of connectors 19-2 hit the group of connectors 15-1.

However, an accident in which the extending ends of the ferrules of the optical connector 41 or the like are damaged is prevented, because the optical connector 41 or the like has one of the following arrangements.

[First Embodiment]

Figure 2:
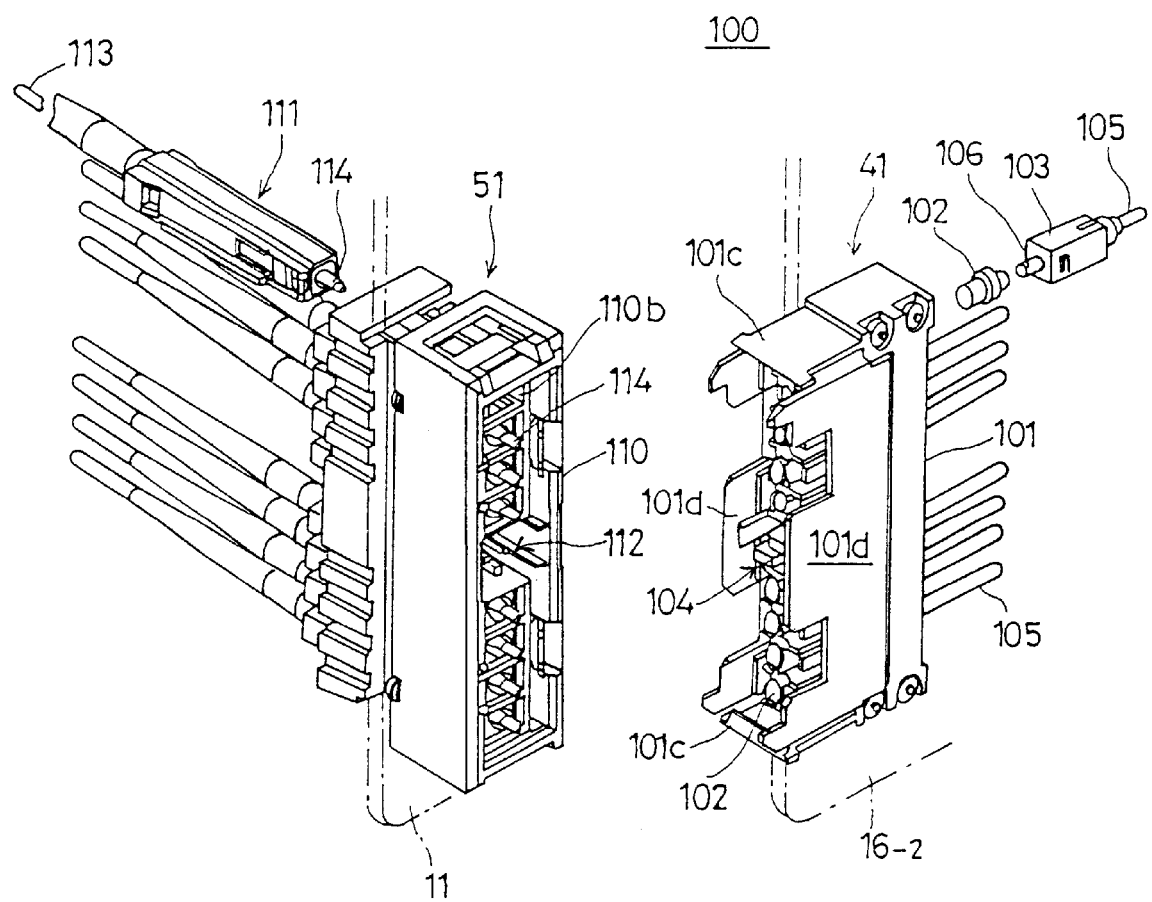
FIG. 2 shows optical connectors in a first embodiment of the present invention.
Figure 3A:
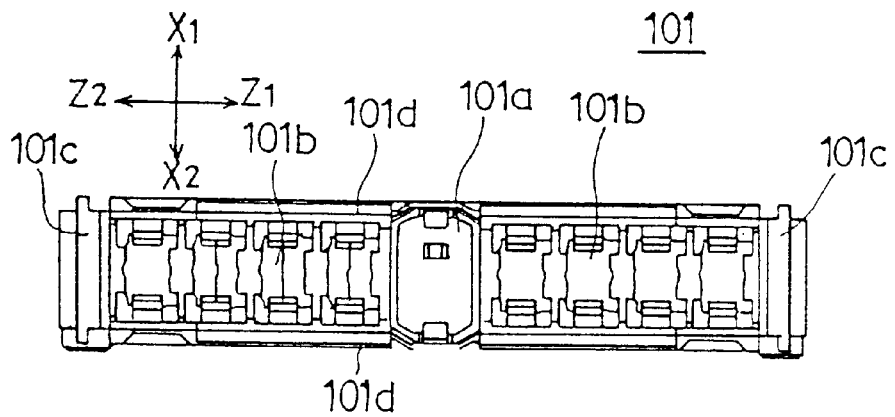
FIGS. 3A, 3B, 3C and 3D show a housing of the package-side optical connector shown in FIG. 2.
Figure 3B:
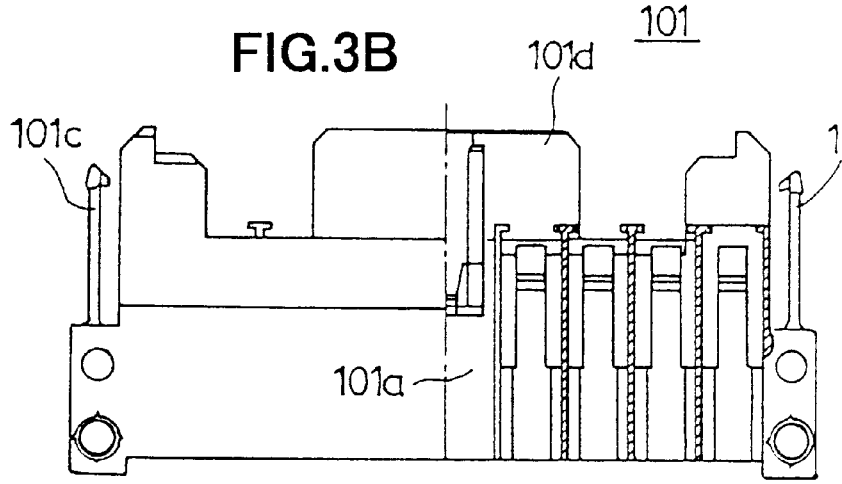
Figure 3D:
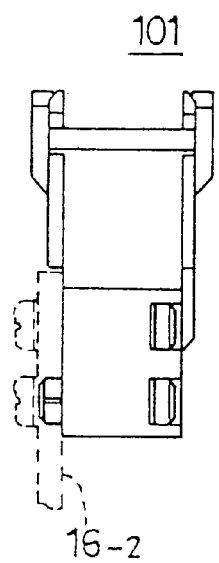
Figure 3C:
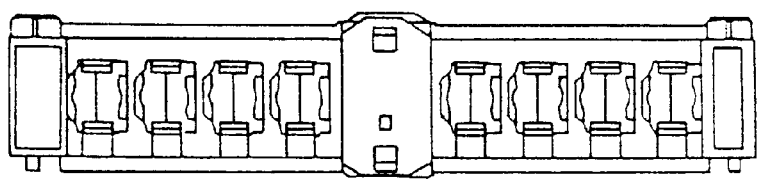
Figure 5A:
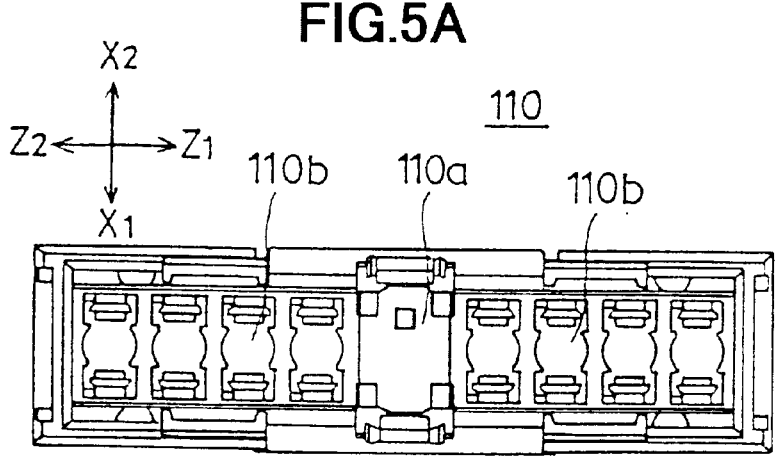
FIGS. 5A, 5B, 5C and 5D show a housing of the backplane-side optical connector shown in FIG. 2.
Figure 5B:
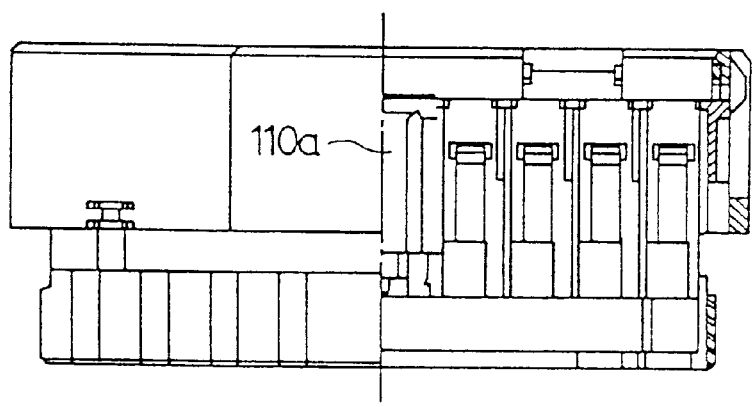
Figure 5D:
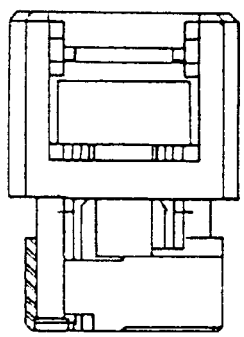
Figure 5C:
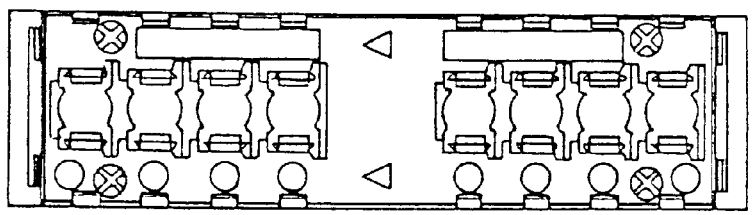

FIG. 2 shows optical connectors 100 in a first embodiment of the present invention. The optical connectors 100 include the package-side optical connector 41 and the backplane-side optical connector 51.

The package-side optical connector 41 is an optical connector which is mounted to the package body 16-2. In the package-side optical connector 41, sleeve holders 102, J-plugs 103 and a coding key 104 are incorporated into a housing 101 shown in FIGS. 3A, 3B, 3C and 3D.

The housing 101 has a coding-key mounting portion 101a at the center thereof, at which portion the coding key 104 is mounted, has four plug mounting portions 101b on either side of the coding-key mounting portion 101a, has an engagement arm portion 101c on both sides in the longitudinal directions, and has fence portions 101d on both sides in the width directions.

The sleeve holder 102 and the J-plug 103, at the extending end of an optical fiber 105, are fitted and mounted to each plug mounting portion 101b. A ferrule 106 at the extending end of the optical fiber 105 projects from the extending-end surface of the J-plug 103. Therefore, the ferrules 106 are aligned in the housing 101.

The coding key 104, shown in FIGS. 4A, 4B and 4C, is mounted in the coding-key mounting portion 101a. The coding key 104 is one of a plurality of coding keys standardized for electric connectors. In the standardized plurality of coding keys, projecting portions form predetermined patterns, respectively, as a result of the projecting portion being provided or not being provided at each of divisions '1' though '8' aligned in two rows, i.e., a Z1-direction side row and a Z2-direction side row, each row including four divisions in the X1, X2 directions when being viewed from the front side, as shown in FIG. 4B. The coding key 104 shown in FIGS. 4A, 4B and 4C has the projecting portions 104a1, 104a2, 104a4 and 104a7 at the divisions '1', '2', '4' and '7', respectively. The coding key 104 has no projecting portions at the divisions of the numerals '3', '5', '6' and '8' indicated by broken lines.

Figure 7A:
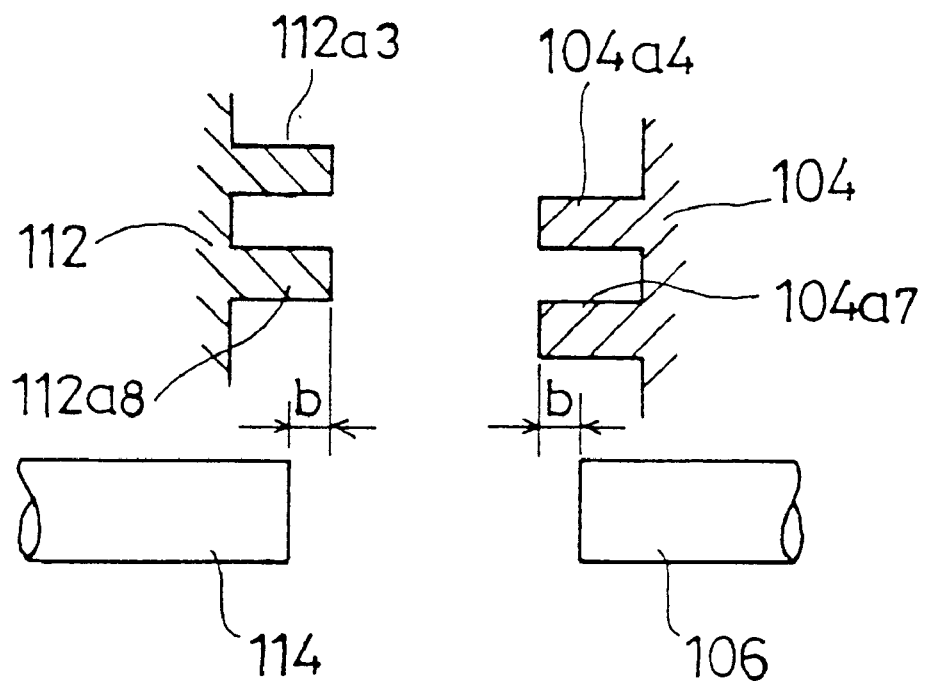
FIGS. 7A and 7B illustrate connection of the optical connectors shown in FIG. 2.

As shown in FIG. 7A, which is a simplified drawing, the projecting portions 104a1, 104a2, 104a4 and 104a7 and the ferrule 106 are arranged so that the projecting portions 104a1 and so forth project further than the extending end of each ferrule 106 by the dimension 'b'.

The backplane-side optical connector 51 is an optical connector mounted to the backplane 11. In the backplane-side optical connector 51, plugs 111 and a coding key 112 are incorporated into an approximately box-shaped housing 110 shown in FIGS. 5A, 5B, 5C and 5D.

The housing 110 has a coding-key mounting portion 110a at the center thereof, at which portion the coding key 104 is mounted, and has four plug mounting portions 110b on either side of the coding-key mounting portion 110a.

The plug 111 at the extending end of an optical fiber 113 is fitted and mounted to each plug mounting portion 110b. A ferrule 114 at the extending end of the optical fiber 113 projects from the extending-end surface of the plug 111. Therefore, the ferrules 114 are aligned in the housing 110.

The coding key 112 shown in FIGS. 6A, 6B and 6C is mounted in the coding-key mounting portion 110a. Similar to the coding key 104, the coding key 112 is also one of the plurality of coding keys standardized for electric connectors. The coding key 112 has projecting portions 112a3, 112a5, 112a6 and 112a8 at divisions '3', '5', '6' and '8'. The coding key 112 has no projecting portions at the divisions of the numerals '1', '2', '4' and '7' indicated by broken lines. Thereby, there is a relation between the coding key 112 and the coding key 104 such that each projecting portion of one coding key is inserted into a respective one of the divisions of the other coding key, at which respective one of the divisions no projecting portion is provided.

As shown in FIG. 7A, the projecting portions 112a3, 112a5, 112a6 and 112a8 and the ferrule 114 are arranged so that the projecting portions 112a3 and so forth project further than the extending end of each ferrule 114 by the dimension 'b'.

Figure 7B:
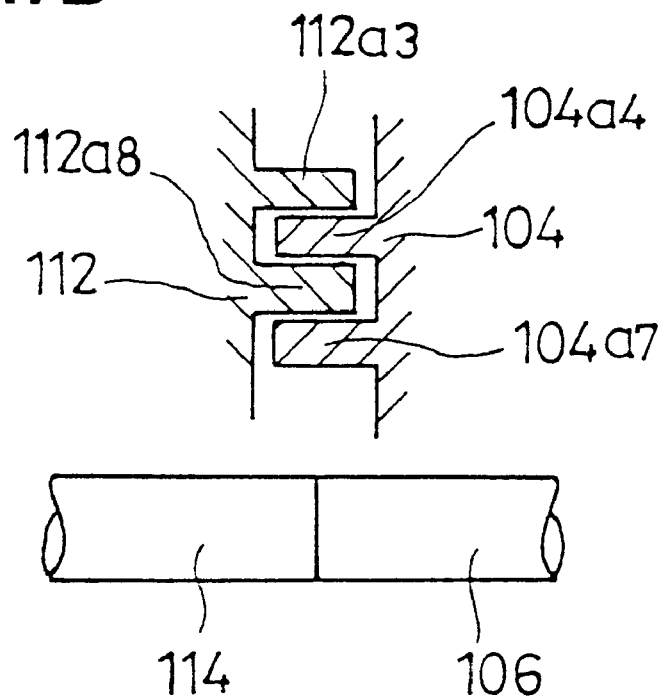

When the package 13-2 is guided by the guide rails 14-2 and inserted in the Y1 direction, as shown in FIG. 1, the projecting portions 104a4 and 104a7 of the coding key 104 do not abut against the projecting portions 112a3 and 112a8 of the coding key 112, as shown in FIG. 7B, which is a simplified drawing, the package-side optical connector 41 is connected with the backplane-side optical connector 51 normally, and the ferrule 106 and the ferrule 114 are pressed against one another by means of a spring (not shown in the figures).

Connection prevention in a case where, as also show in FIG. 1, a worker erroneously causes the guide rails 14-1 to guide the package 13-2 and thus inserts the package 13-2 will now be described.

In this case, the electric connector 40, optical connector 41, optical connector 42 and electrical connector 43 of the group of connectors 19-2 are attempted to be connected with the electrical connector 30, electrical connector 31, electrical connector 32 and optical connector 33 of the group of connectors 15-1.

Figure 8A:
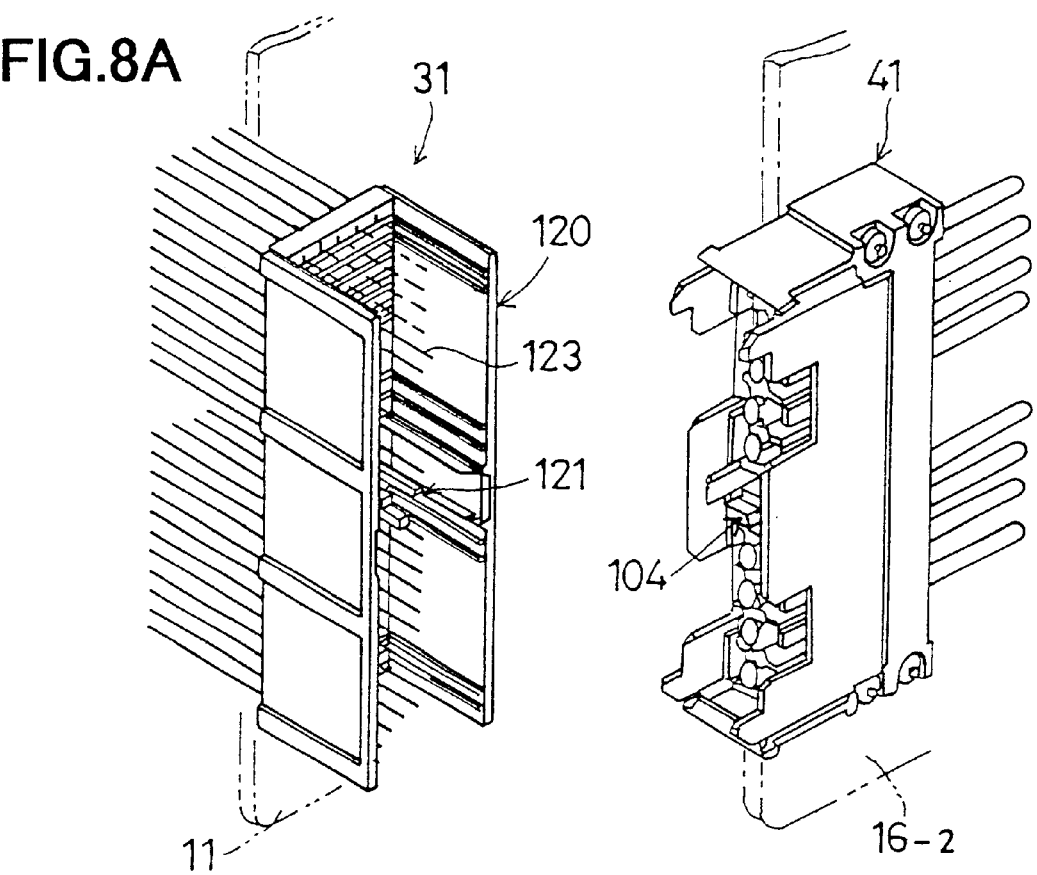
FIGS. 8A, 8B and 8C illustrate prevention of connection of the optical connector to an electrical connector in a case of erroneous insertion of a package.
Figure 8B:
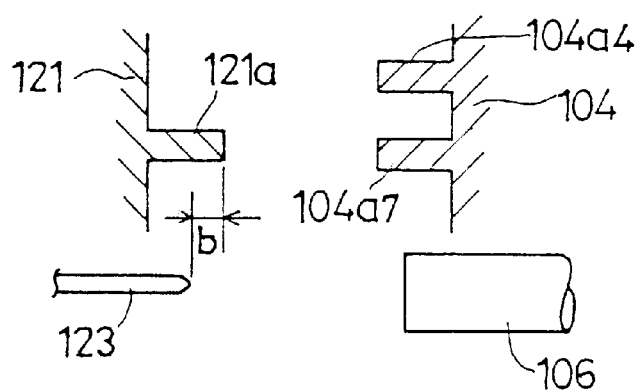
Figure 8C:
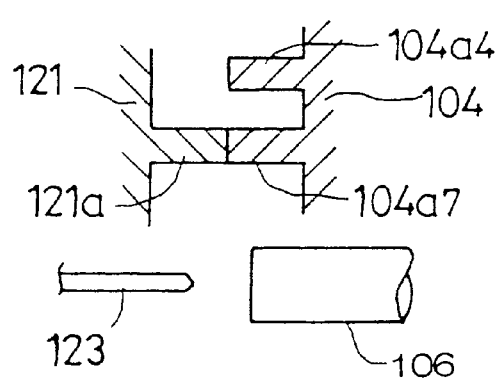

FIGS. 8A, 8B and 8C show the relationship between the package-side optical connector 41 of the package 13-2 and the backplane-side electrical connector 31 on the backplane 11, in FIG. 1.

As shown in FIG. 8A, a coding key 121 is incorporated in the backplane-side electrical connector 31 at the center of a housing 120 thereof, and long pin terminals 123 are fixed in the housing 120, side by side. As shown in FIG. 8B, the extending end of a projecting portion 121a of the coding key 121 projects further than the extending end of each pin terminal 123 by the dimension 'b'. There is no relation between the coding key 104 and the coding key 121 such that each projecting portion of one coding key is inserted into a respective one of the divisions of the other coding key, at which respective one of the divisions no projecting portion is provided.

As a result, when the package-side optical connector 41 is attempted to be connected with the backplane-side electrical connector 31, the projecting portion 104a7 of the coding key 104 abuts against the projecting portion 121a of the coding key 121, before the ferrules 106 come into contact with the pin terminals 123, as shown in FIG. 8C. Thereby, connection between the package-side optical connector 41 and the backplane-side electrical connector 31 is prevented.

Figure 9A:
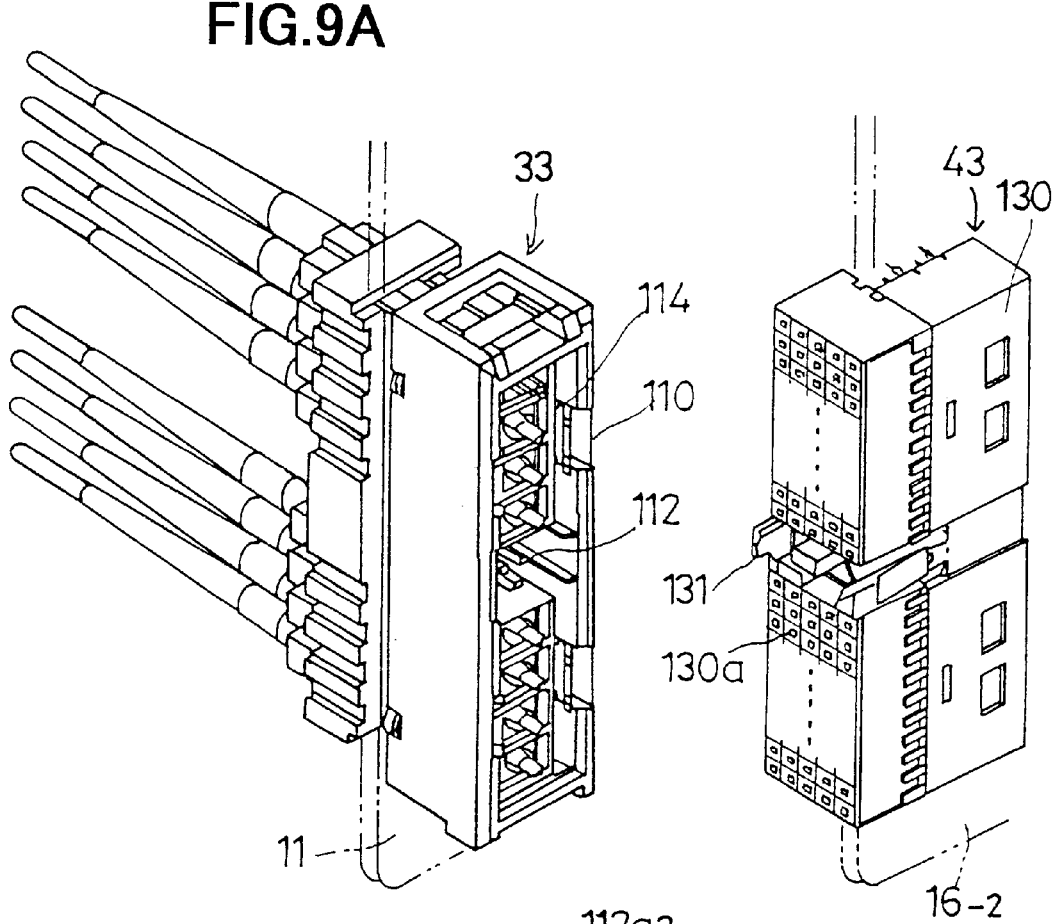
FIGS. 9A, 9B and 9C illustrate prevention of connection of an electrical connector to the optical connector in a case of erroneous insertion of a package.
Figure 9B:
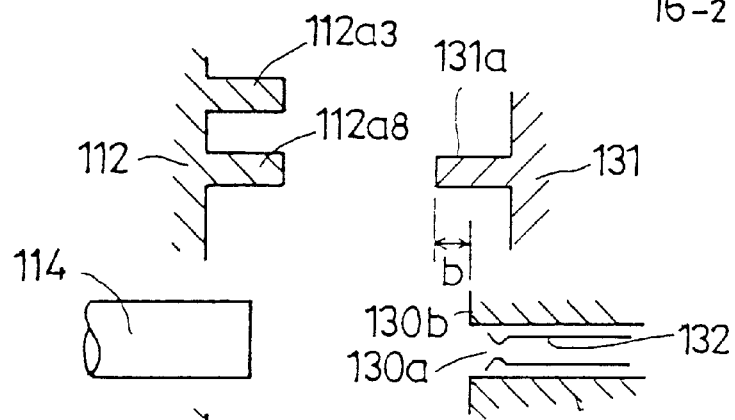
Figure 9C:
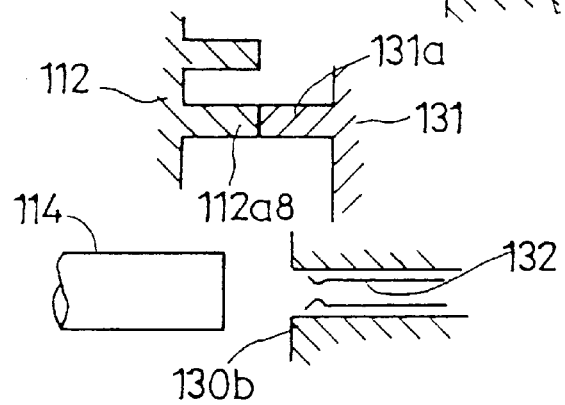

FIGS. 9A, 9B and 9C show the relationship between the package-side electrical connector 43 of the package 13-2 and the backplane-side optical connector 33 on the backplane 11, in FIG. 1. The backplane-side optical connector 33 is the same as the backplane-side optical connector 51 shown in FIG. 2.

As shown in FIG. 9A, in the package-side electrical connector 43, a coding key 131 is incorporated at the center of a housing 130 thereof. Clipping terminals 132 are provided in holes 130a of the housing 130, respectively, as shown in FIG. 9B. As shown in FIG. 9B, the extending end of a projecting portion 131a of the coding key 131 projects further than the front surface 130b of the housing 130 by the dimension 'b'. There is no relation between the coding key 131 and the coding key 112 such that each projecting portion of one coding key is inserted into a respective one of the divisions of the other coding key, at which respective one of the divisions no projecting portion is provided.

Therefore, when the package-side electric connector 43 is attempted to be connected with the backplane-side optical connector 33, the projecting portion 131a of the coding key 131 abuts against the projecting portion 112a8 of the coding key 112, before the front surface 130b of the housing 130 comes into contact with the ferrules 114, as shown in FIG. 9C. Thereby, connection between the package-side optical connector 43 and the backplane-side electrical connector 33 is prevented.

Thus, first, the end surfaces of the ferrules 106 are prevented from hitting the pin terminals 123 and being damaged, and the end surfaces of the ferrules 116 are prevented from being damaged, as a result of the front surface 130b of the housing 130 being prevented from hitting the ferrules 114. Second, when a worker performs such erroneous insertion of the package 13-2 with great force, the projecting portions of the coding keys 104, 121, 131 and 112, which first abut against each other, are damaged, so that the optical connector 41, electrical connector 31, electrical connector 43 and optical connector 33 are prevented from being damaged, There may be a case where, when a worker erroneously inserts the package into an incorrect place, the package-side optical connector is attempted to be connected with the backplane-side optical connector. Also in this case, first, the package-side optical connector is prevented from being connected with the backplane-side optical connector, as a result of the coding key of the package-side optical connector abutting against the coding key of the backplane-side optical connector. Second, if the pressing force is large, because the coding keys which abut against one another are damaged, the package-side optical connector and the backplane-side optical connector are prevented from being damaged.

[Second Embodiment]

Figures 10A, 10B:
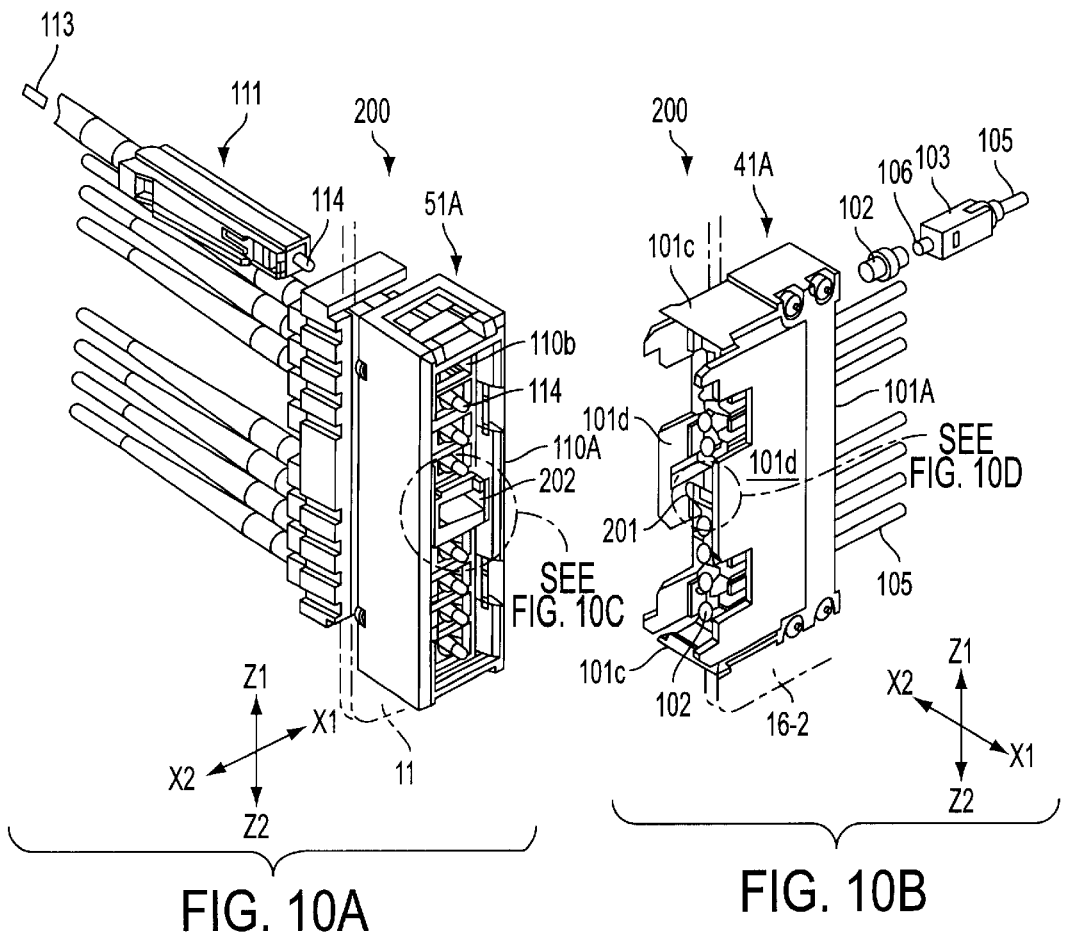
FIG. 10 shows optical connectors in a second embodiment of the present invention.
Figures 10C, 10D:
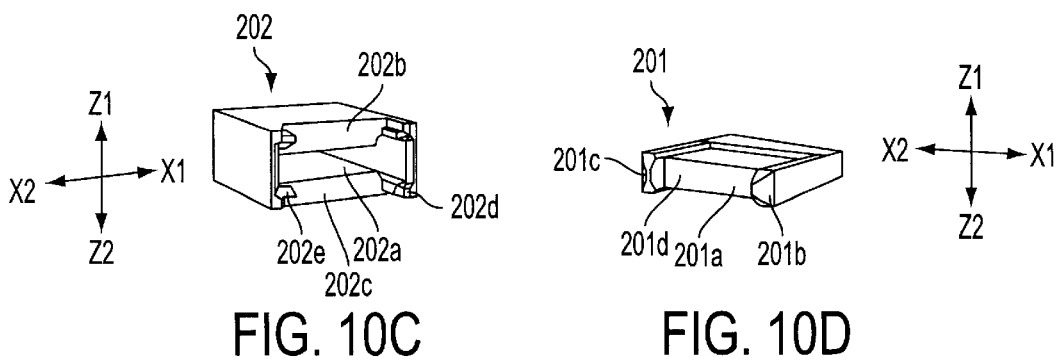

FIG. 10 shows optical connectors 200 in a second embodiment of the present invention. The optical connectors 200 include a package-side optical connector 41A and a backplane-side optical connector 51A. In FIG. 10, the same reference numerals are given to portions/components the same as those shown in FIG. 2, and the same reference numerals with 'A' added thereto are given to portions/components corresponding to those shown in FIG. 2.

The package-side optical connector 41A is an optical connector which is mounted to the package body 16-2, and, in a housing 101A thereof, shown in FIGS. 11A and 11B, the sleeve holders 102 and J-plugs 103 are incorporated, and the ferrules 106 are aligned.

The housing 101A integrally has a coding key 201, which is special for optical connectors, at the center thereof.

Figure 12A:
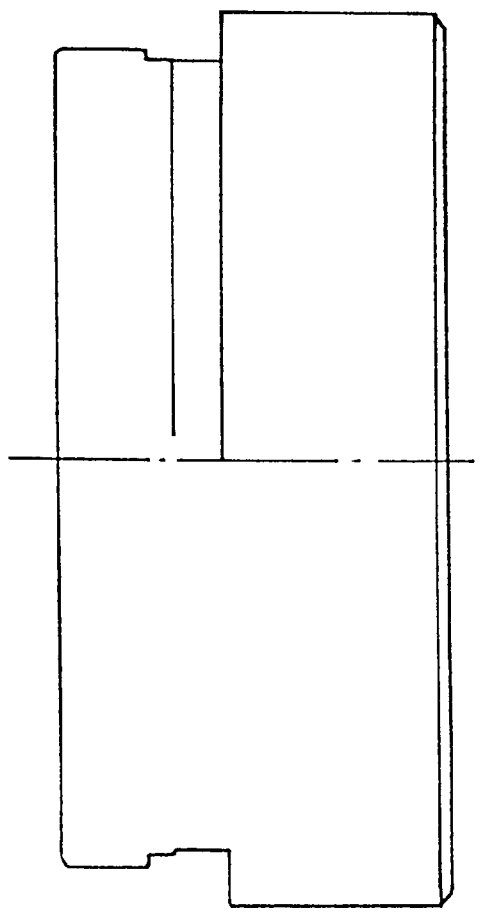
FIGS. 12A and 12B show a housing of the backplane-side optical connector show in FIG. 10.
Figure 12B:
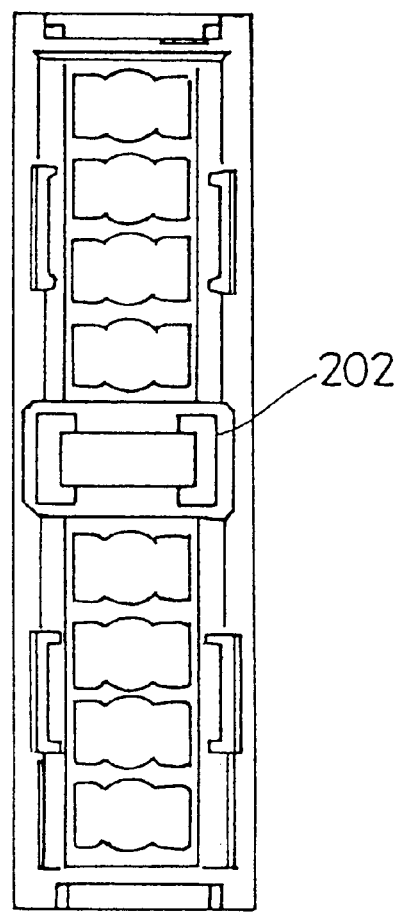

The backplane-side optical connector 51A is an optical connector mounted on the backplane 11, and, in an approximately box-shaped housing 110A thereof, shown in FIGS. 12A and 12B, the plugs 111 are incorporated, and the ferrules 114 are aligned.

The housing 110A integrally has a coding key 202, which is special for optical connectors, at the center thereof.

The coding key 201 and coding key 202 are those other than the coding keys standardized for electric connectors, and are molded integrally with the housings 101A and 110A, respectively.

Figure 13A:
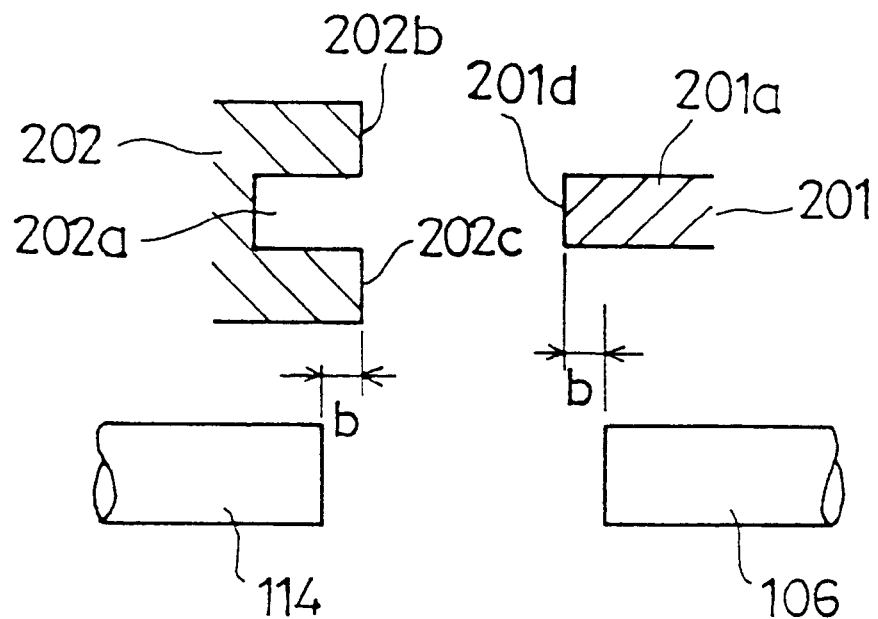
FIGS. 13A and 13B illustrate connection of the optical connectors shown in FIG. 10.

As shown in FIG. 10, the coding key 201 includes a rectangular-parallelepiped-shaped block 201a and tapered projecting portions 201b, 201c on both sides, in the X1, X2 directions, of the block 201a. As shown in FIG. 13A, an end surface 201d of the block 201a, which surface has a rectangular shape long in the X1, X2 directions, projects further than the extending end of each ferrule 106 by the dimension 'b'.

As shown in FIG. 10, the coding key 202 includes a cavity portion 202a, and facing portions 202b, 202c along the cavity portion 202a on both sides in the Z1, Z2 directions, each of which portions has a rectangular shape long in the X1, X2 directions. The cavity portion 202a has a size such as to receive the rectangular-parallelepiped-shaped block 201a and tapered projecting portions 201b, 201c, and includes tapered portions 202d, 202e formed at both ends, in the X1, X2 directions, of the cavity portion 202a. As shown in FIG. 13A, the facing portions 202b, 202c project further than the extending end of each ferrule 114 by the dimension 'b'.

In the relationship between the coding key 201 and the coding key 112 shown in FIGS. 6A, 6B and 6C, the end surface 201d abuts against a Z2-side portion of the projecting portion 112a3 and Z1-side portions of the projecting portions 112a5, 112a6 and 112a8.

In the relationship between the coding key 202 and the coding key 104 shown in FIGS. 4A, 4B and 4C, the facing portion 202b abuts against Z1-side portions of the projecting portions 104a1, 104a2, 104a4, and the facing portion 202c abuts against a Z2-side portion of the projecting portion 104a7.

Figure 13B:
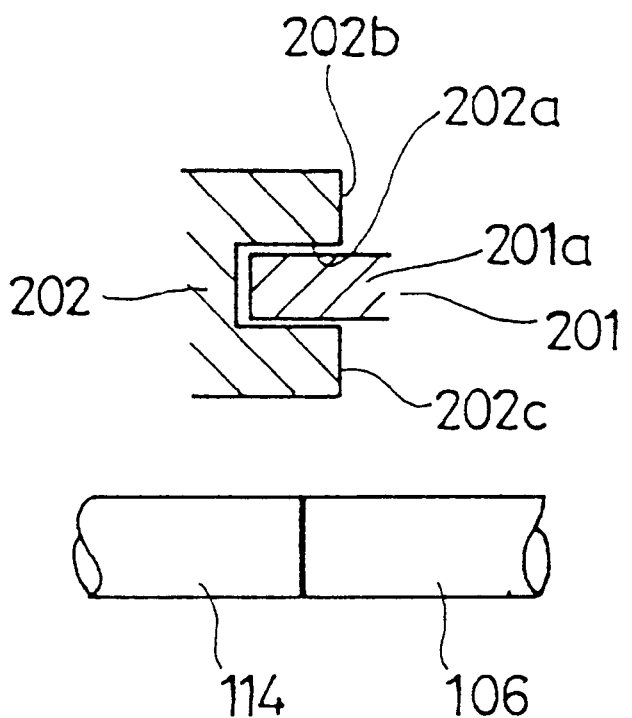

When the package 13-2 is guided by the guide rails 14-2 and is inserted in the Y1 direction, as shown in FIG. 1, the tapered projecting portions 201b, 201c are guided by the tapered portions 202d, 202e, respectively, the coding key 201 enters and is fitted into the cavity portion 202a of the coding key 202, as shown in FIG. 13B, which is a simplified drawing, the package-side optical connector 41A is connected with the backplane-side optical connector 51A normally, and the ferrules 106 and the ferrules 114 are pressed against one another by means of a spring (not shown in the figures).

Connection prevention in a case where, as also shown in FIG. 1, a worker erroneously causes the guide rail 14-1 to guide the package 13-2 and thus inserts the package 13-2 will now be described.

In this case, the electric connector 40, optical connector 41A, optical connector 42 and electric connector 43 of the group of connectors 19-2 are attempted to be connected with the electric connector 30, electric connector 31, electric connector 32 and optical connector 33A of the group of connectors 15-1. The backplane-side optical connector 33A is the same as the backplane-side optical connector 51A shown in FIG. 10.

Figure 14A:
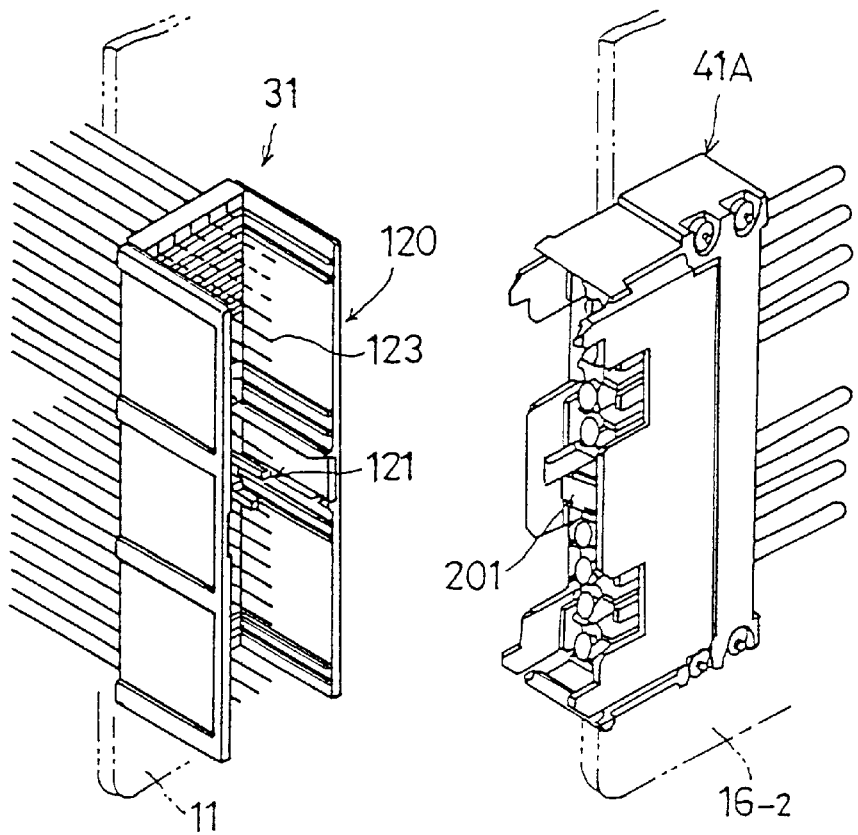
FIGS. 14A, 14B and 14C illustrate prevention of connection of the optical connector to an electrical connector in a case of erroneous insertion of a package.
Figure 14B:
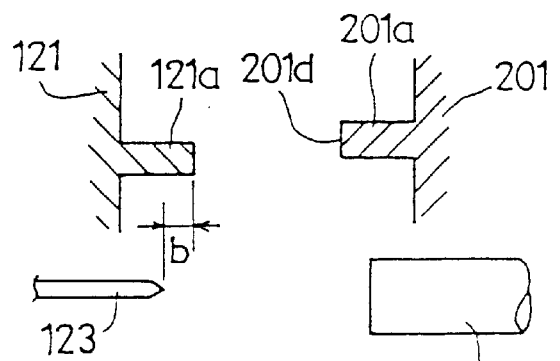
Figure 14C:
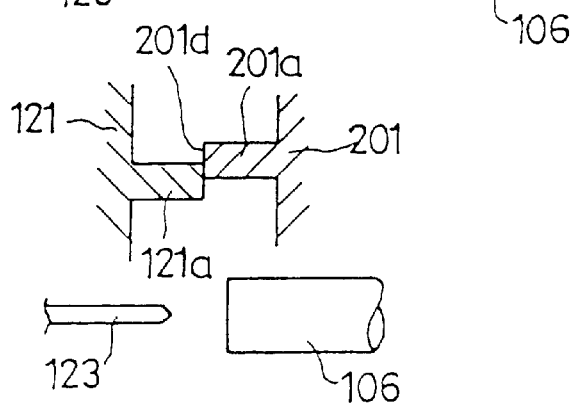

FIGS. 14A, 14B and 14C shows the relationship between the package-side optical connector 41A of the package 13-2 and the backplane-side electrical connector 31 on the backplane 11, in FIG. 1.

As shown in FIG. 14B, there is no relation between the coding key 201 and the coding key 121 of the backplane-side electrical connector 31 such that the coding key 201 is inserted into appropriate ones of the divisions of the coding key 121, at which appropriate ones of divisions no projecting portions are provided.

Therefore, when the package-side optical connector 41A is attempted to be connected with the backplane-side electrical connector 31, the end surface 201d of the block 201a of the coding key 201 abuts against the projecting portion 121a of the coding key 121, before the ferrules 106 come into contact with the pin terminals 123, as shown in FIG. 14C. Thereby, connection between the package-side optical connector 41A and the backplane-side electrical connector 31 is prevented.

Figure 15A:
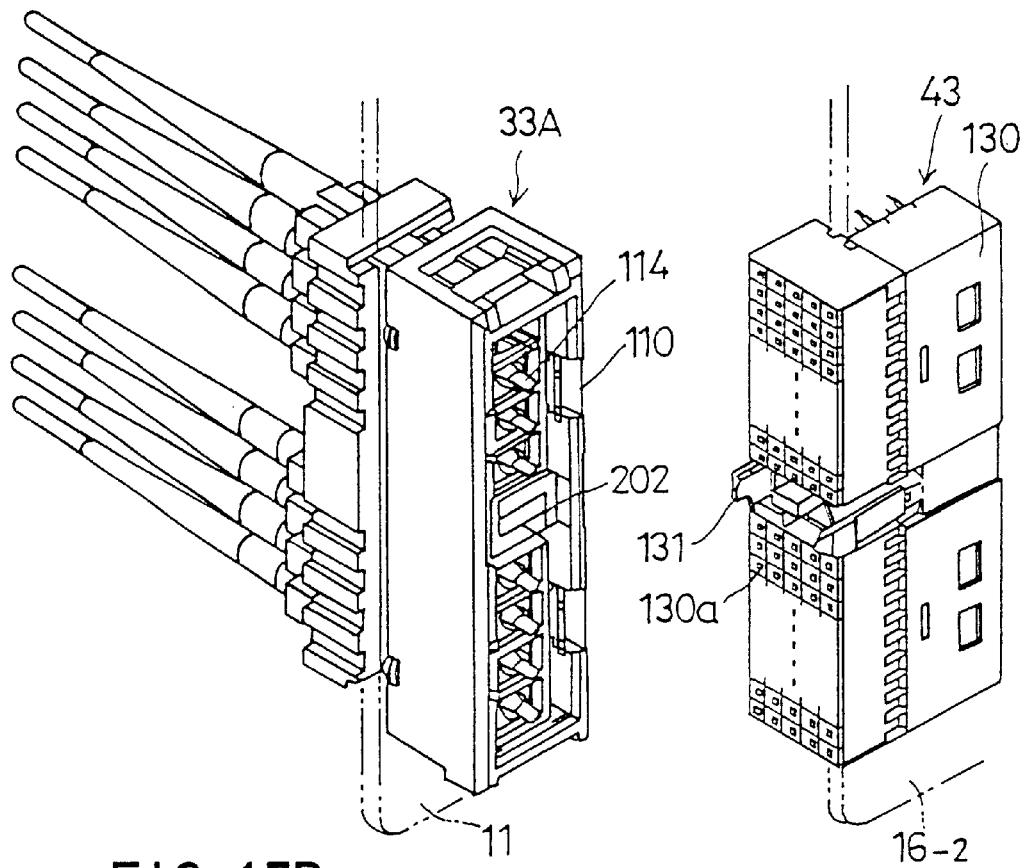
FIGS. 15A, 15B and 15C illustrate prevention of connection of an electrical connector to the optical connector in a case of erroneous insertion of a package.
Figure 15B:
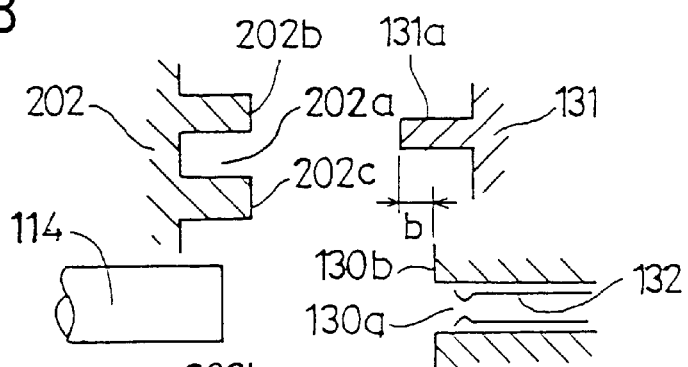
Figure 15C:
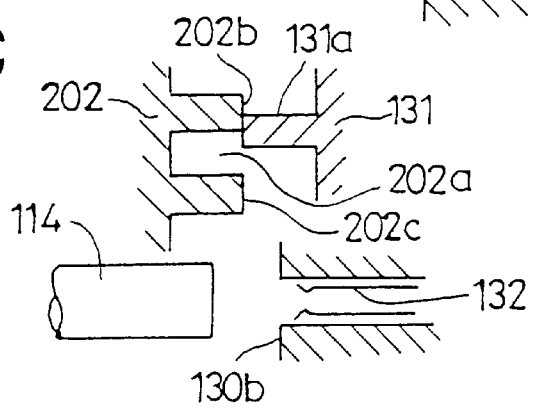

FIGS. 15A, 15B and 15C show the relationship between the package-side electrical connector 43 of the package 13-2 and the backplane-side optical connector 33A on the backplane 11, in FIG. 1.

As shown in FIG. 15B, there is no relation between the coding key 131 of the package-side electrical connector 43 and the coding key 202 such that the projecting portion 131a of the coding key 131 is inserted into the cavity portion 202a of the coding key 202, and the facing portions 202b, 202c of the coding key 202 are inserted into appropriate ones of the divisions of the coding key 131, at which appropriate ones of the divisions no projecting portions are provided.

Therefore, when the package-side electrical connector 43 is attempted to be connected with the backplane-side optical connector 33A, the projecting portion 131a of the coding key 131 abuts against the facing portion 202b of the coding key 202, before the front surface 130b of the housing 130 comes into contact with the ferrules 114, as shown in FIG. 15C. Thereby, connection between the package-side optical connector 43 and the backplane-side electrical connector 33A is prevented.

Thus, first, the end surfaces of the ferrules 106 are prevented from hitting the pin terminals 123 and being damaged thereby, and the end surfaces of the ferrules 114 are prevented from being damaged, as a result of the front surface 130b of the housing 130 being prevented from hitting the ferrules 114. Second, when a worker performs such erroneous insertion of the package 13-2 with great force, the projecting portions of the coding keys 121 and 131 which first abut against the coding keys 201 and 202, respectively, are damaged, so that the optical connector 41A, electrical connector 31, electrical connector 43 and optical connector 33A are prevented from being damaged.

It is also possible that the coding keys 201 and 202 are separate members, and are incorporated into the housings 10A and 110A, respectively.

[Third Embodiment]

Figure 16:
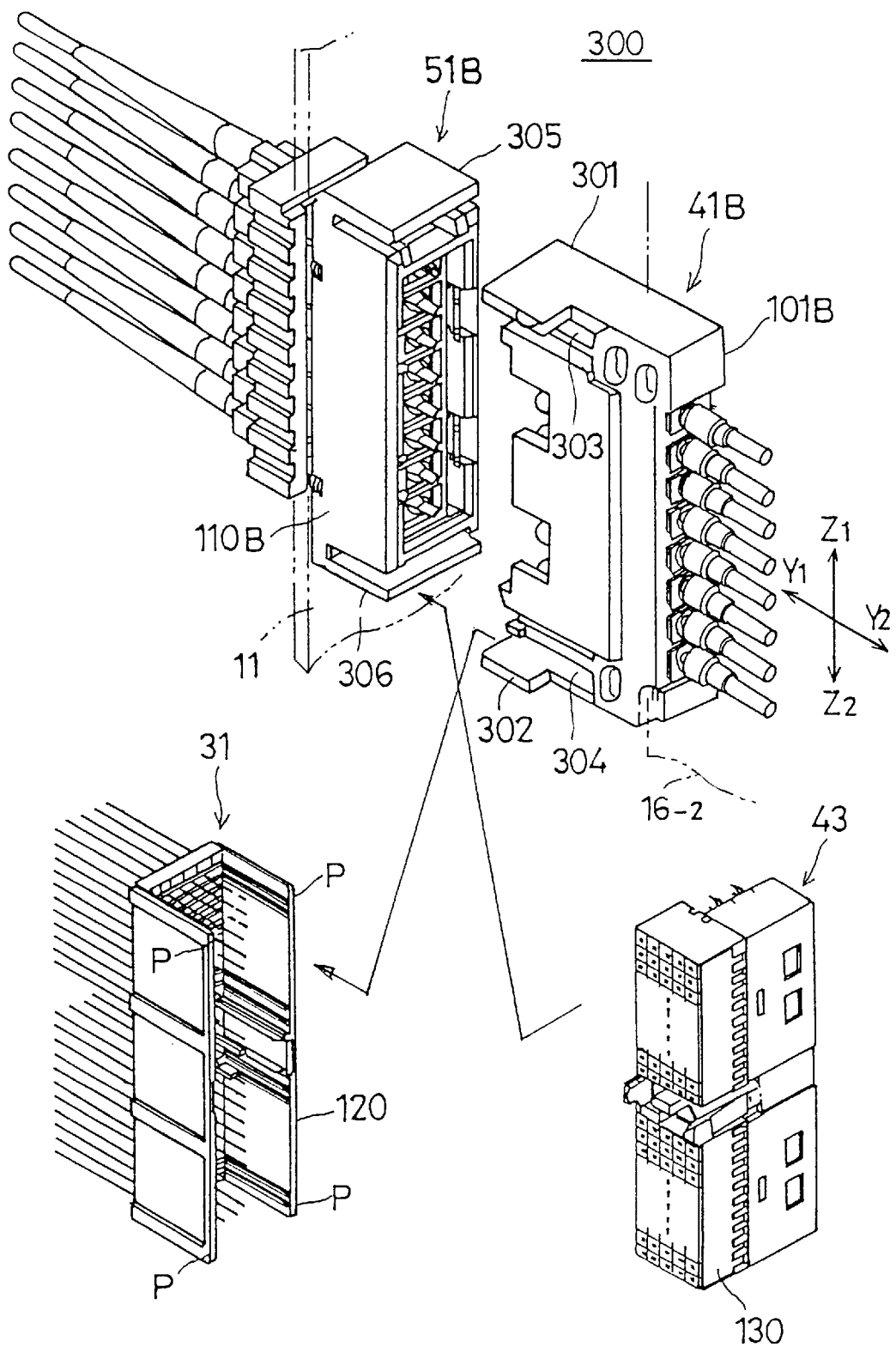
FIG. 16 shows optical connectors in a third embodiment of the present invention.

FIG. 16 shows optical connectors 300 in a third embodiment of the present invention. The optical connectors 300 include a package-side optical connector 41B and a backplane-side optical connector 51B. In FIG. 16, the same reference numerals are given to portions/components the same as those shown in FIG. 2, and the same reference numerals with 'B' added thereto are given to portions/components corresponding to those shown in FIG. 2.

The package-side optical connector 41B has, at the Z1, Z2-direction ends, arm portions 301, 302 each projecting in the Y1 direction. Gaps 303, 304 are provided inside of the arm portions 301, 302, respectively.

The backplane-side optical connector 51B has, at the Z1, Z2-direction ends, arm portions 305, 306 each projecting in the Y2 direction.

The arm portions 305, 306 are inserted into the gaps 303, 304, respectively, and the optical connector 41B and the optical connector 51B are connected with one another.

When the optical connector 41B is attempted to be connected with the electrical connector 31, the extending ends of the arm portions 301, 302 abut against four portions, indicated by the reference numeral P, in the proximity of the Z1, Z2-direction ends of the housing 120 of the electrical connector 31. Thereby, the connection is prevented.

When the electrical connector 43 is attempted to be connected with the optical connector 51B, portions in the proximity of the Z1, Z2-direction ends of the housing 130 of the electrical connector 43 abut against the arm portions 305, 306 because the arm portions 305, 306 project slightly further than the other portion of the housing 110B in the Y2 direction. Thereby, the connection is prevented.

[Fourth Embodiment]

Figure 17:
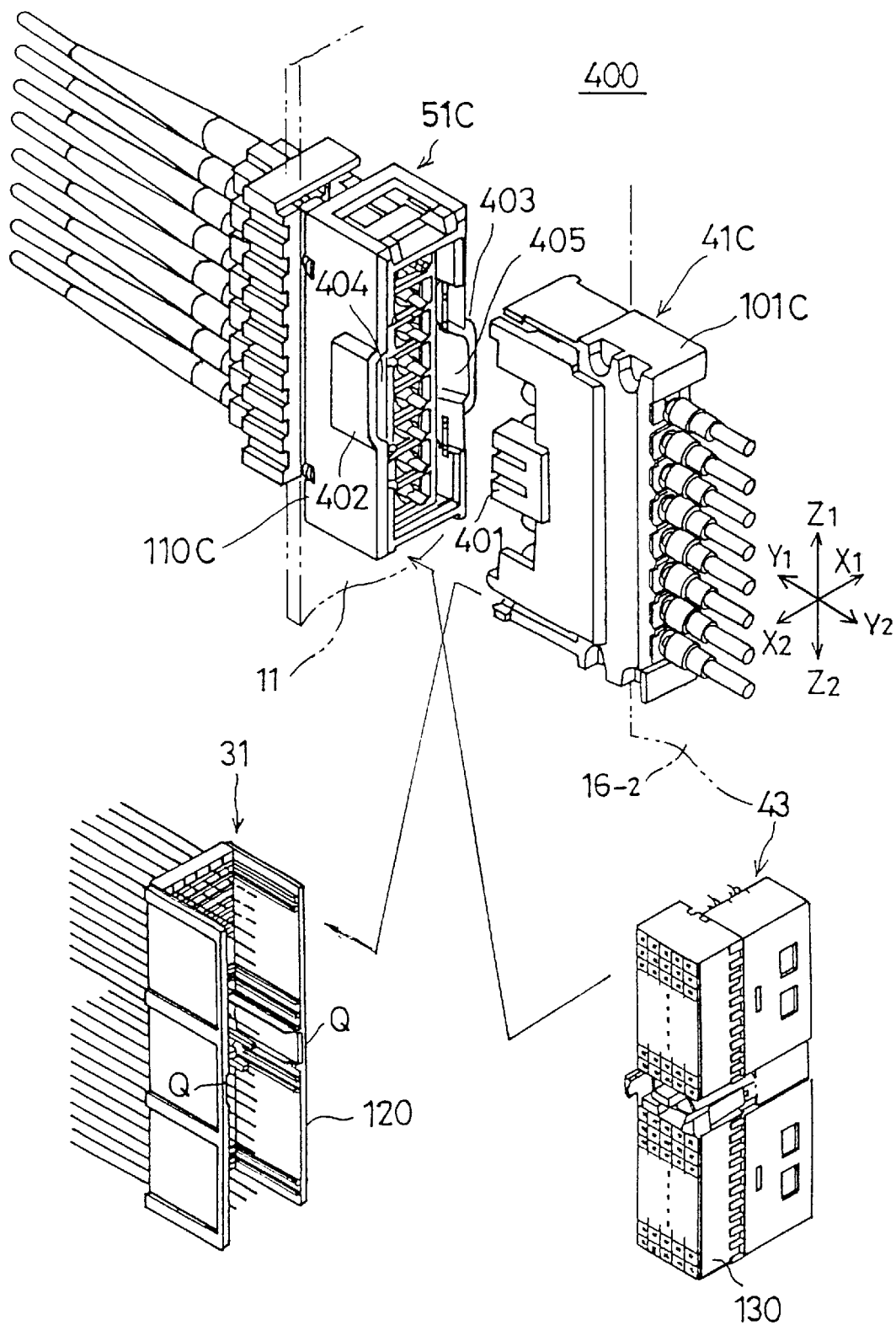
FIG. 17 shows optical connectors in a fourth embodiment of the present invention.

FIG. 17 shows optical connectors 400 in a fourth embodiment of the present invention. The optical connectors 400 include a package-side optical connector 41C and a backplane-side optical connector 51C. In FIG. 17, the same reference numerals are given to portions/components the same as those shown in FIG. 2, and the same reference numerals with 'C' added thereto are given to portions/components corresponding to those shown in FIG. 2.

The package-side optical connector 41C has, at the center in the Z1, Z2 directions, projecting portions 401 (the other one being not shown in the figure) projecting in the X1, X2 width directions.

The backplane-side optical connector 51C has, at the center in the Z1, Z2 directions, projecting portions 402, 403 projecting in the X1, X2 width directions. Cavity portions 404, 405 are provided inside of the projecting portions 402, 403, respectively, the projecting portions 401 of the package-side optical connector 41C being inserted into the cavity portions 404, 405, respectively.

The projecting portions 401 of the optical connector 41C are inserted into the cavity portions 404, 405 of the optical connector 51C, respectively, and the optical connector 41C and the optical connector 51C are connected with one another.

When the optical connector 41C is attempted to be connected with the electrical connector 31, the extending ends of the projecting portions 401 of the optical connector 41C abut against portions, indicated by the reference numeral Q, of the housing 120. Thereby, the connection is prevented.

When the electrical connector 43 is attempted to be connected with the optical connector 51C, the housing 130 of the electrical connector 43 abuts against the projecting portions 402, 403 because the projecting portions 402, 403 project slightly further than the other portion of the housing 110C in the Y2 direction. Thereby, the connection is prevented.

Further, the present invention is not limited to the above-described embodiments, and variations and modifications may be made without departing from the scope of the present invention.

The present application is based on Japanese priority application No. 10-260600 filed on Sep. 14, 1998, the entire contents of which are hereby incorporated by reference.

What is claimed is:

1. An apparatus comprising:

a first optical connector having an optical-connector housing incorporating a ferrule, wherein a code-identifying arrangement provided at the first optical connector is configured to identify and connect to a code-identifying arrangement of a second optical connector, and include an extending end to project further than an extending end of said ferrule.

2. The apparatus as claimed in claim 1, wherein the first optical connector further comprises:

a coding-key mounting portion in which the code-identifying arrangement is provided thereon.

3. An optical connector comprising:

an optical-connector housing incorporating a ferrule at an extending end of an optical fiber, said optical-connector housing having a first coding key mounted to the optical connector, said first coding key having an arrangement which abuts against a coding key for an electrical connector, but does not abut against a second coding key configured for connecting to said first coding key, both, said first coding key and second coding key arranged for optical connectors; and an extending end of said first coding key which projects further than an extending end of said ferrule.

4. An optical connector comprising:

an optical connector housing incorporating a ferrule at an extending end of an optical fiber; and a first coding key mounted to the optical connector and arranged for connecting to a second coding key configured for a different optical connector, the first coding key extending beyond an end of the ferrule to abut against a coding key for an electrical connector, but does not abut against the second coding key.

5. An optical connector comprising:

first means for incorporating a ferrule at an extending end of an optical fiber; and second means for causing a first coding key to be mounted to the optical connector and arranged for connecting to a second coding key configured for a different optical connector, the first coding key extending beyond an end of the ferrule to abut against a coding key for an electrical connector, but does not abut against the second coding key.

6. An optical connector comprising:

means for incorporating a ferrule at an extending end of an optical fiber and having a first coding key mounted to the optical connector, said first coding key having an arrangement which abuts against a coding key for an electrical connector, but does not abut against a second coding key configured for connecting to said first coding key, both, said first coding key and second coding key arranged for optical connectors; and an extending end of said first coding key to project further than an extending end of said ferrule.

* * * * *